United States Patent

Stockli et al.

[11] Patent Number: 5,756,881
[45] Date of Patent: May 26, 1998

[54] GAS ANALYSIS OR LEAK DETECTION PROCESS AND DEVICE FOR SAME

[75] Inventors: Armin Leo Stockli, Oberrohrdorf; Urs Walchli, Heiligkreuz; Martin Bösch, Azmoos, all of Switzerland

[73] Assignee: Balzers Aktiengesellschaft, Furstentum, Luxembourg

[21] Appl. No.: 575,526

[22] Filed: Dec. 20, 1995

[30] Foreign Application Priority Data

Dec. 23, 1994 [CH] Switzerland ............ 3923/94

[51] Int. Cl.$^6$ ............ G01M 3/20
[52] U.S. Cl. ............ 73/40.7
[58] Field of Search ............ 73/40.7

[56] References Cited

U.S. PATENT DOCUMENTS

| | | | |
|---|---|---|---|
| 3,626,760 | 12/1971 | Briggs et al. | 73/40.7 |
| 3,645,127 | 2/1972 | Mongodin et al. | 73/40.7 |
| 3,690,151 | 9/1972 | Briggs | 73/40.7 |
| 3,968,675 | 7/1976 | Briggs | 73/40.7 X |
| 4,419,882 | 12/1983 | Ishii et al. | 73/40.7 |
| 4,472,962 | 9/1984 | Mennonga | 73/40.7 |
| 4,773,256 | 9/1988 | Saulgeot | 73/40.7 |
| 4,776,207 | 10/1988 | Holme | 73/40.7 |
| 4,893,497 | 1/1990 | Danielson | 73/40.7 |
| 5,297,422 | 3/1994 | Baret | 73/40.7 |
| 5,341,671 | 8/1994 | Beret et al. | 73/40.7 |
| 5,537,857 | 7/1996 | Grosse Bley | 73/40.7 |

FOREIGN PATENT DOCUMENTS

| | | | |
|---|---|---|---|
| 245843 | 11/1987 | European Pat. Off. | 73/40.7 |
| 481414 | 4/1992 | European Pat. Off. | 73/40.7 |
| 0498434 | 8/1992 | European Pat. Off. | |
| 0607908 | 7/1994 | European Pat. Off. | |
| 3124205 | of 1981 | Germany. | |
| 4228313 | 3/1994 | Germany | 73/40.7 |

*Primary Examiner*—Michael Brock
*Assistant Examiner*—Daniel S. Larkin
*Attorney, Agent, or Firm*—Notaro & Michalos P.C.

[57] ABSTRACT

A process and device for gas analysis has an input for a gas analyzer which is meant for connection to a vacuum pump. At least a portion of the gas to be analyzed is supplied at the inlet by applying a pump flux to the inlet. Superimposed on the pump flux is a further gas flux which is supplied over one or more gas line segments at a non-molecular flow-dominant flowrate.

16 Claims, 7 Drawing Sheets

GAS ANALYSIS OR LEAK DETECTION PROCESS AND DEVICE FOR SAME

FIELD AND BACKGROUND OF THE INVENTION

The present invention relates to a process for gas analysis and/or leak detection, as well as devices for practicing the processes.

In the generation of high vacuum (HV) or ultrahigh vacuum (UHV) high-vacuum pumps, gas type-dependent compression is used. With respect to a definition of the vacuum range and pump types, reference is made to "Grundlagen der Vakuumtechnik. Berechnungen und Tabellen" (Foundations of Vacuum Technology, Calculations and Tables), Leybold AG, Catalogue Number 199 89 (Lit. 1). Mechanical-kinetic vacuum pumps operate, for example, in the molecular pressure range with gas type-dependent compression as a function of the type $\exp(\sqrt{m})$ where m is the mass of the gas molecules of the type of gas under consideration.

In practice, the gas-type dependent compression of such pumps affects, in particular, gases of low molecular mass. By this are understood gases whose molecules have a mass $m \leq 28$ u where u denotes the "atomic mass unit".

It is also known, for example, in leak detection configurations, to utilize the gas type-dependent compression of such pumps to advantage, because such pumps in counterflow principle act as "lowpass mass filters". The low compression obtained for gas types of low molecular mass permit diffusion of the cited gas type, against the direction of pump delivery.

On the other hand, however, the presence of gas type-dependent compression can also be a serious disadvantage because the partial pressure at the high-pressure side of such a pump or pump stage, due to the mentioned relatively low partial compression, affects the partial pressure ratios at its low-pressure inlet. If the compression with respect to a considered gas type is high, the partial pressure ratios at the high-pressure side output of the pump, have only a negligible effect on the partial pressure ratios at the low-pressure side input of the pump. The ratio of the partial pressures at the high-pressure side to those at the low-pressure side of the pump, in that case, is determined by other processes, such as, for example, desorption.

In the case of light gases, as stated, the compression of such pumps is low so that the partial pressure at the high-pressure side of the pump outlet determines the partial pressure at the low-pressure side of the pump inlet, for example according to Wutz 1992.1, p. 267. To influence the partial pressure on the low-pressure side of such pumps or pump stages, independently of the fact of whether or not this partial pressure is to be increased or decreased, at present the following two known principles are available:

1. Change of the pump compression

A decrease of the pump compression can be attained through reduction of the number of rotations and/or increase of the pump conductance or through reduction of the number of effective pump stages.

An increase of the compression and therewith decoupling of the partial pressure at the low-pressure side from that at the high-pressure side can be attained by increasing the number of rotations at the pump and/or by adding additional pump stages. The increase of the number of rotations as well as the decrease of the pump conductance is restricted by narrow mechanical limits.

2. Partial pressure change at the high-pressure side pump outlet

By increasing the total pressure at the high-pressure side pump outlet an increase of a partial pressure at the low-pressure side pump inlet results.

A decrease of the total pressure and/or the generation of an intentional gas flushing upstream of the high-pressure side pump outlet, i.e. of the prevacuum pump, yield a partial pressure decrease at the low-pressure side pump inlet.

Such approaches to a solution are known. Furthermore, for example from U.S. Pat. No. 4,893,497, it is known to provide, at the high-pressure side of a molecular pump on a leak detection configuration, a sweeping gas valve in order to carry out a gas flushing during a flushing phase, after the leak detection operation has been completed.

As stated in the introduction, the present invention relates to the field of measuring technology or gas analysis and in particular leak detection. In contrast to evacuation techniques for vacuum receptacles used in process technology, in which essentially stationary pressure conditions are targeted, in the cited measuring techniques, great significance is to be attached to the so-called system response to fast changes of the measuring signal.

SUMMARY OF THE INVENTION

The present invention has the goal to achieve in the cited measuring processes or measuring instruments a fast dynamic behavior, i.e. short "response time", and high sensitivity, in a simple cost-effective manner, i.e. to meet requirements, such as high sensitivity and fast dynamic behavior, which in the vacuum measuring field, conventionally are so-to-speak mutually exclusive.

In the following, and in conjunction with FIG. 1, the way in which the partial compression can be influenced with a specifically established gas flux will be explained.

Figure 1:
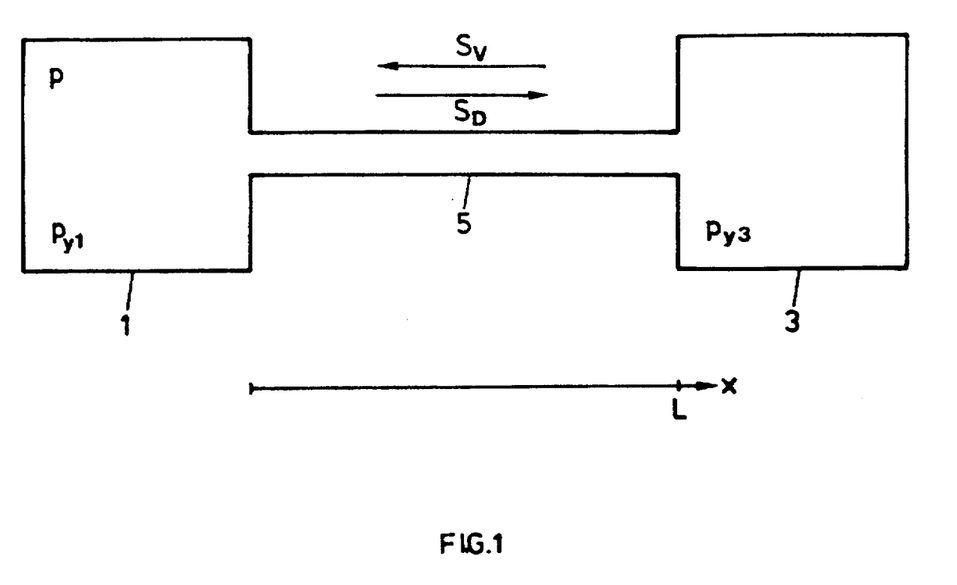
FIG. 1 is a schematic illustration of conditions utilized according to the invention but which is also known per se, depicting for understanding the approach according to the invention.

In FIG. 1, the numerals 1 and 3 denote two large receptacles which will be assumed to be equalized with respect to the total pressure p of a gas mixture Z. Let the partial pressure $p_y$ of a gas component Y in receptacle 1 be $p_{y1}$ and in receptacle, 3, $p_{y3}$. Let $$p_{y1} < p_{y3}.$$

This yields a gas diffusion flux in the direction of the pressure gradient, as illustrated with $S_D$. If now for the gas type Y in a connection line 5, a Knudsen or a viscous flux $S_v$, against the diffusion flux $S_D$, is created, then along the X coordinate, assuming a gas concentration c proportional to the partial pressure and with the simplification of identical flow rate over the line cross section, $$c(x) = c_1 \cdot \exp(-x^\lambda),$$

where $c(x)$=concentration of gas Y at site x, and $\lambda = D/v_v$, with D as diffusion constant of gas Y in gas Z and with $v_v$ as flow rate of the non-molecular flux $S_v$.

With respect to the definitions of the molecular Knudsen and viscous flow, reference is made to Lit. 1 above.

For the gas Y the partial compression between sites $x=0$ and $x=L$ is obtained $$c(0)/c(L) = \exp(L^\lambda) \tag{1}$$

It is evident that by superimposing a non-molecular flow, i.e. a flow in the Knudsen or in the viscous range, a decrease of the diffusion flux $S_D$ of the considered gas type can be established. Consequently, the partial compression between the receptacles 1 and 3 can be adjusted in broad limits by the established flux $S_V$. In order to increase the partial compression between receptacles 1 and 3, the superimposed gas flux $S_v$ is laid out so that the flow rate $V_V$ overcompensates the diffusion of the considered gas type Y.

The superimposed flux $S_v$ is generated by a flow of gas z with type Y or by the flow of a gas not comprising the gas type Y. Over the length of the non-molecular gas flow for the one or for several considered gas types, any desired compression $\geq 1$ can be set. As evident in expression (1), the aim is to select the ratio $L/{}^{\delta o}$ to be a magnitude which is as large as possible in order to exert the largest lasting effect possible on the partial compression along the non-molecular flow path.

Surprisingly, utilizing these rules the posed task can be solved according to the invention, namely through the processes described above. It is therewith possible, simply to set the gas type-specific partial compression at a pump stage, in particular to increase or stabilize it. To attain this via an increase of the rotational speed at the pump stage or by decreasing the pump conductance or by adding further pump stages, is disproportionally expensive and decreases the long-term reliability of the devices in question.

With the preferred use of a kinetic vacuum pump stage operating in the Knudsen or viscous pressure range, potentially in addition to a choke, this pump, according to M. Wutz et al., "Theorie und Praxis of Vakuumtechnik", 5th edition, page 646, Table 16.11, can be for example a gas ring vacuum pump operating in the Knudsen or in the viscous range, a turbovacuum pump, among them an axial vacuum pump or a radial vacuum pump, in particular preferably a Holweck pump or a turbomolecular-Holweck combination, in particular a so-called "wide range" pump, but not a turbomolecular pump alone, which operates only in the molecular flow range, and also not for example a diaphragm pump or a rotary vane pump which are not kinetic vacuum pumps. A rotary vane pump may, however, precede the pump used according to the invention and operating in the viscous or Knudsen range. Through the influence according to the invention of the partial compression via the cited pump stage operating in the Knudsen or viscous pressure range, the partial compression at the first pump, connected ahead of that at the low-pressure side, is influenced.

The pump delivery flow means the gas flow which is effected and made possible by a pump or pump stage, due to its compression. If, basically through the pump stage operating in the Knudsen or viscous pressure range, a gas flow is generated and superimposed onto the counterflow pump delivery flow, the following results:

- with superimposed flux direction against the counterflow direction, a diffusion inhibition or prevention takes place, which for a considered light gas also increases the compression of the counterflow pump stage;
- a stabilization of the gas composition at the low-pressure side inlet of the kinetic vacuum pump occurs, in particular when using a flow element which limits conductance.

Analysis and leak detection instruments according to the invention, which solve the above described task, are distinguished according to other features of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the following, the invention will be explained by example in conjunction with the drawings wherein.

DESCRIPTION OF THE PREFERRED EMBODIMENTS

The conditions known in principle and explained in conjunction with FIG. 1, using a pump, especially well suited for use according to the invention on analysis or leak detection devices, will be discussed relevant to practice.

It should be pointed out at this time that the gas analysis and the leak detection technique according to the invention, addressed even as a matter of priority, have in common that the gas analyzer devices and gas detectors are highly sensitive to input-side gas pressures which exceed their nominal pressure. Therefore, mastering and stabilizing the compression of vacuum pumps provided at the input side of these devices requires, special consideration. It is very unexpected that the utilization of the simple conditions, as were explained in conjunction with FIG. 1, yields the requisite mastery and stability, in addition to the properties representing the task, without including the expensive measures of the prior art. And this all the more since the approach according to FIG. 1 previously, if at all, was used only for known and far less critical pumping techniques, such as for example, for evacuating high or ultrahigh vacuum operating chambers.

Figure 2:
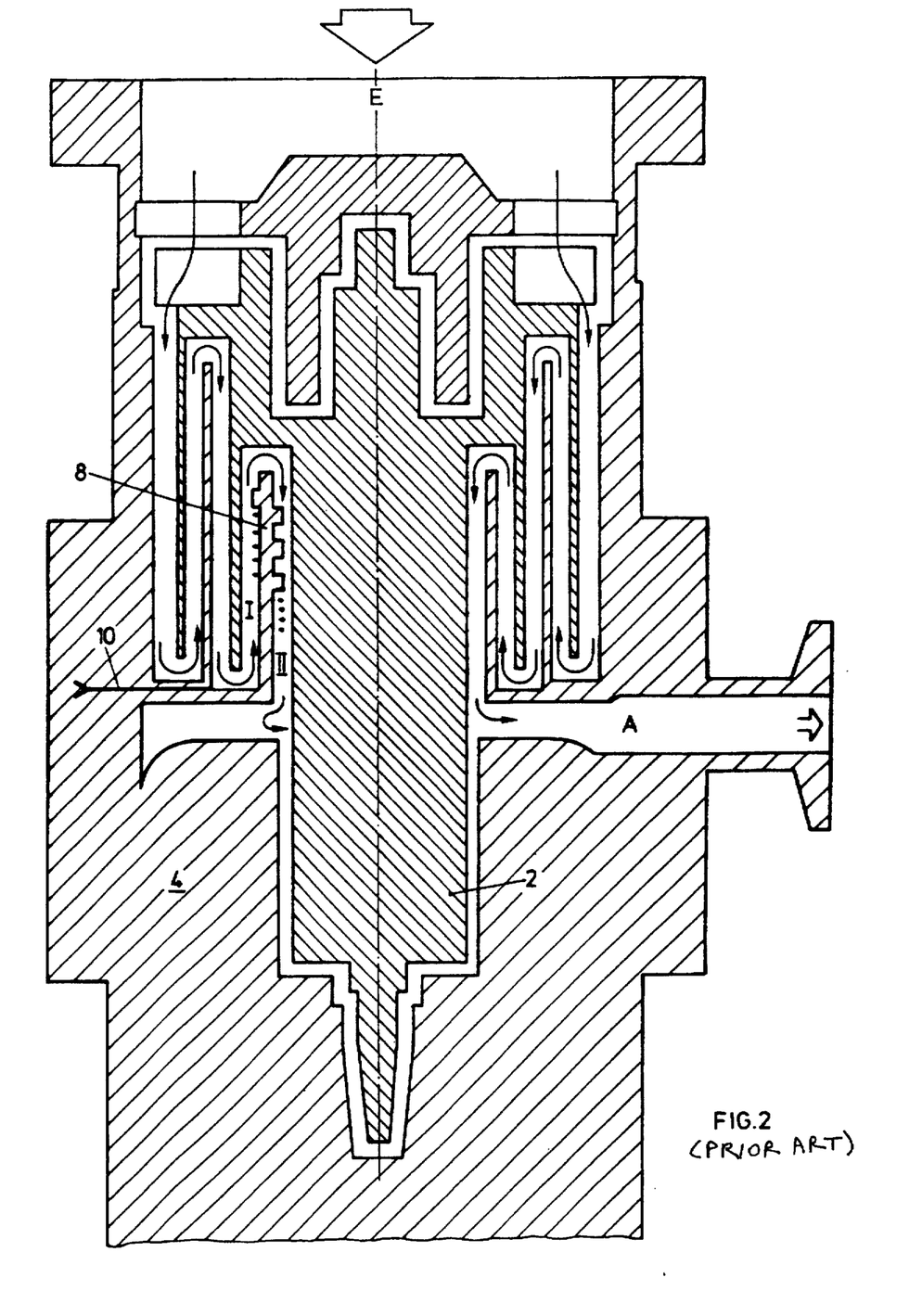
FIG. 2 is a sectional view of a known mechanical kinetic pump used for gas analysis, and in particular for leak detection, of type TPD 022 by Balzers-Pfeiffer, Wetzlar, used to explain a numerical calculation of the invention.

FIG. 2 illustrates a mechanical kinetic pump, specifically a Holweck pump of type PTD 022 by Balzers-Pfeiffer, Wetzlar.

The pump is constructed, in a manner known per se, to have a rotor 2 and a stator 4. As indicated partially and schematically at 8, helical grooves are provided on the stator 4. A line 10 provided for the compression-setting gas GS used for the approach according to the invention, terminates before the inner two pump stages I, II.

The gap along the two stages is dimensioned as follows:
groove depth d=2 mm;
groove width h=3 mm;
length of the helical groove=40 cm.

Let the pressure at output A of the molecular pump be 5 mbars, thus at 2 mm groove depth, operation takes place in the viscous pressure range at least at output A of the pump.

As an example of a light gas, helium-depleted air or dry nitrogen is used through line 10 for generating the gas flux $S_v$, analogous to FIG. 1, through the molecular pump.

The diffusion coefficient is obtained as:

$$D(p) = (p/po) \cdot D(po),$$

for helium in air:

1000 mbars/(5 mbars)·0.58 cm²/s=116 cm²/s.

The flow through the pump takes place at 0.01 mbar l/s, from which one obtains:

$$v_v(5 \text{ mbars}) = \frac{0.01 \text{ mbar} \cdot 10^3 \text{ cm}^3/\text{s}}{5 \text{ mbar} \cdot 0.2 \text{ cm} \cdot 0.3 \text{ cm}} = 33 \text{ cm/s}$$

Furthermore, one obtains $$\lambda = \frac{116 \text{ cm}^2 \cdot \text{s}^{-1}}{33 \text{ cm} \cdot \text{s}^{-1}} = 3.48 \text{ cm}$$

In contrast to the conditions assumed in FIG. 1, the total pressures P corresponding to the two receptacles 1 and 3 are not identical at the low-pressure and high-pressure side of the molecular pump. This leads to the fact that the diffusion constant D as well as also the flow rate $V_V$ are not constant along the pump groove. But because the diffusion constant D as well as also the flow rate $V_V$ are inversely proportional to the pressure, $\lambda$ remains independent of pressure as long as viscous flow obtains.

The partial helium compression over the length L of 40 cm is calculated as $$k_{He} = \exp(40 \text{ cm}/3.48 \text{ cm}) = 10^5.$$

In practical embodiments of the invention the partial compression of helium $k_{He}$ obtained is smaller than the calculated value since between the groove trains of the Holweck pump a backflow of the gas takes place and the gas rate over the groove cross section is not constant. A reduction of the partial helium compression achieved through the flux also results if viscous flow does not occur over the entire gap length of 40 cm.

The described process is applied in gas analysis configurations or in particular leak detection configurations with light test gases, in which a high-vacuum pump or pump stage according to the main flow principle, according to the counterflow principle or according to the partial counterflow principle, is used.

On the pump according to FIG. 2 the stages preceding line 10 can operate in the molecular range and can thus have "counterflow capability".

In leak detection or gas analysis according to the main flow principle the test gas port is evacuated via a high-vacuum pump as well as a prevacuum pump and is directly connected with a test gas or analysis gas detector or analyzer device such as in particular, a mass spectrometer and preferably a quadrupole mass spectrometer. For the leak detection or gas analysis according to the counterflow principle the test gas or analysis gas port is connected to the high-pressure side of a high-vacuum pump whose low-pressure side is connected to the test gas detector or analyzer device, such as, the mentioned mass spectrometer. The light test gas or light analysis gas fractions flux in counterflow through the, high-vacuum pump preceding the test gas detector or analyzer device.

The test gas or analysis gas port is further connected to the low-pressure side of a prevacuum pump. With the partial counterflow principle of the invention, one or several high-vacuum pump stages are, for this purpose, connected in front (that is upstream) of the low-pressure input of the pre-vacuum pump.

Figure 3:
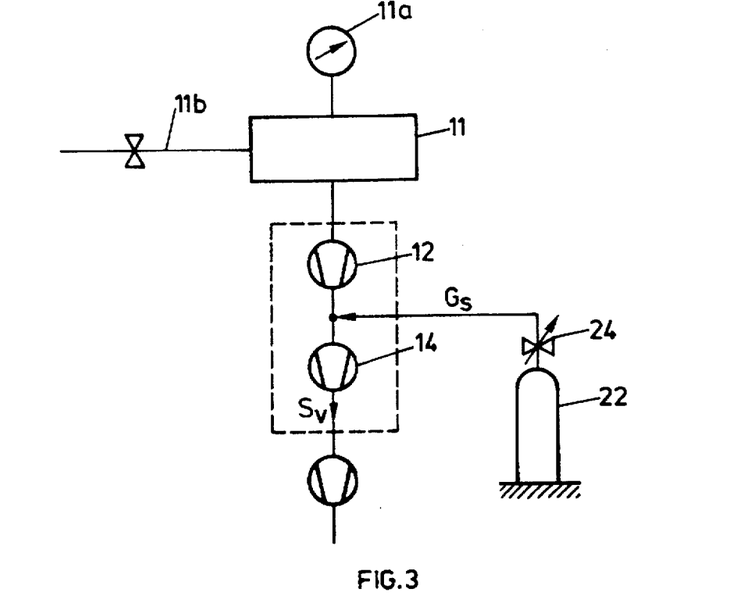
FIGS. 3 to 6 are schematic illustrations of different preferred realizations of the process according to the invention or of the devices according to the invention.

In FIG. 3, a configuration for evacuating an analyzer device input 11 is depicted schematically. As shown schematically, at input 11 is connected to an analysis measuring device, such as a mass spectrometer 11a. 11b represents the feed line or inlet for the analysis gas. Two high-vacuum pump configurations 12 and 14 are provided. The pump configurations 12 and 14 can be stages of one and the same pump, as shown in dashed lines, for example the stages of a pump whose stages 14 can operate in the Knudsen flow range or in the viscous flow range.

The stages of configuration 12 can operate in the molecular pressure range and, in case of discrete pump implementation, the pump 12 can be a turbomolecular pump that creates a pump flux $S_D$.

According to the invention, the flow gas $G_S$ is introduced at the low-pressure side of the pump configuration 14 operating in the non-molecular pressure range. Through the superimposed gas flux $S_V$ through said pump or pump stage 14, the partial compression for light gases is increased. Any desired gas can be used as the gas $G_s$ generating the gas flux $S_v$, except a gas whose compression is to be increased.

Figure 4:
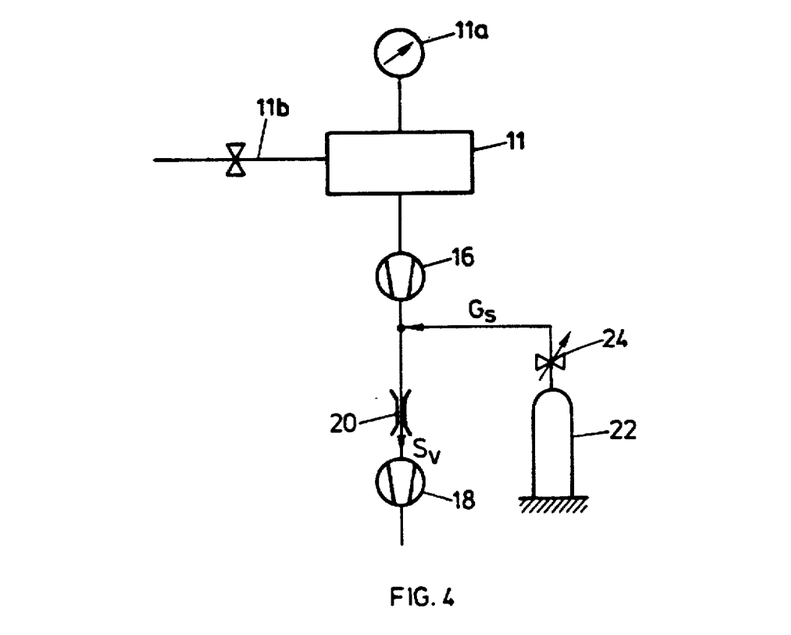

According to FIG. 4 for the evacuation of the recipient 11, two high-vacuum pumps 16 and 18 are connected across a compression stage 20 which, according to the invention, is non-molecular. The high-vacuum pump 16 can again be any desired continuously operating pump while according to the invention pump 18 can be a pump operating in the Knudsen or in the viscous pressure range. Depending on the layout of the choke site 20 the pump 18 can also operate in the molecular range. The non-molecular flow-dominated compression stage or choke 20 is formed by a line connecting the high-pressure side of the pump 16 with the low-pressure side of the pump 18, into which the flow gas $G_s$, as already depicted in FIG. 3, is introduced from a gas source, for example a gas tank 22, and is preferably adjustable as is shown schematically by a valve 24.

Figure 5:
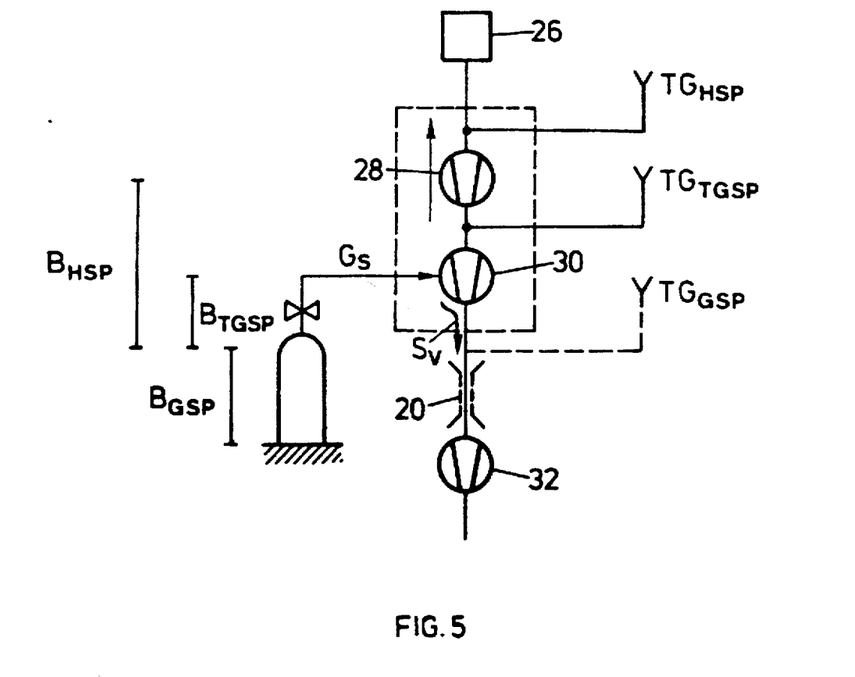

In FIG. 5 a leak detection or gas analysis configuration according to the invention and operating according to the process of the invention, is shown. A test gas detector or gas analyzer 26, preferably a mass spectrometer, preferably a quadrupole mass spectrometer, is connected to the low-pressure side of a high-vacuum pump 28. This high-pressure pump is succeeded at the high-pressure side by a further high-vacuum pump 30 and a fore-pump 32.

In an alternative embodiment following the main flow principle, the test gas or analysis gas port $TG_{HSP}$ is connected to the low-pressure port of the high-vacuum pump 28, i.e. supplied directly to the test gas detector or the analyzer device 26. In a further alternative embodiment following the partial counterflow principle, the test gas or analysis gas port $TG_{TGSP}$ is placed between the high-vacuum pumps 28 and 30 and, lastly, in the third alternative embodiment as shown in dashed lines at $TG_{GSP}$, following the counterflow principle, the test gas or analysis gas port is provided at the low-pressure side of the fore-pump 32. In the case of the partial counterflow and counterflow principle, the test gas or analysis gas accordingly flows or has a flux in counterflow through pumps 28 or 30 and 28.

In this procedure for the purpose of gas analysis or, in particular, leak detection, very fast response rise and fall times are achieved in contrast to the procedure according to FIG. 3. This is extremely advantageous especially for gas analysis and leak detection.

For the main flow principle, the flow gas $G_S$ is introduced at the detector side in the region $B_{HSP}$, i. e after a pump stage or pump.

For the partial counterflow principle, the gas inlet is provided in the region $B_{TGSP}$ for the counterflow principle in region $B_{GSP}$. The gas flux $S_v$ superimposed according to the invention during the analysis or leak detection operation, is in any event in the direction shown in FIG. 5. Consequently, for the particular pump stages or pumps through which gas is flowing, the condition applies that they permit Knudsen or viscous flow.

Analogously to FIG. 4, the flow gas $G_S$ can also be supplied to a flow-dominated or conductance-limited compression stage 20, for example between high-vacuum pump 30 and fore-pump 32, generally in the particular port region B.

Figure 6:
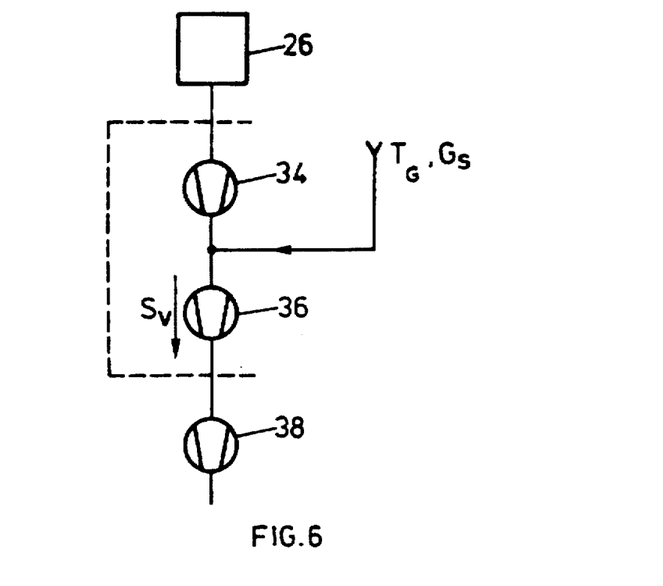

For leak detectors in a sniffing operation according to FIG. 6 preferably the test gas $T_G$ itself or a portion thereof is used as flow gas $G_S$ in order to increase through the flux $S_v$, the partial compression of the high-vacuum pump 36 or the high-vacuum pump stage 36 which operates in the Knudsen or viscous pressure range. This prevents the partial pressure of the test gas at the high-pressure side of the pump or pump stage 36 from acting via the low test gas partial compression at the high-vacuum pump 34 operated in counterflow upon the detector 26. As is shown again in dashed lines, the pumps 34 and 36 can be correspondingly laid out stages of a discrete high-vacuum pump of said type, or the test gas and flow gas inlet can be provided at a connection line, used as a flow-dominated compression stage, between pumps 34 and 36.

It is furthermore entirely possible to provide the gas flow according to the invention in cascading form at several series-connected pumps or pump stages in order to increase their partial compression in cascading form. It is also possible to use the process according to the invention on a pump 38 which discharges in normal atmosphere.

Figure 7:
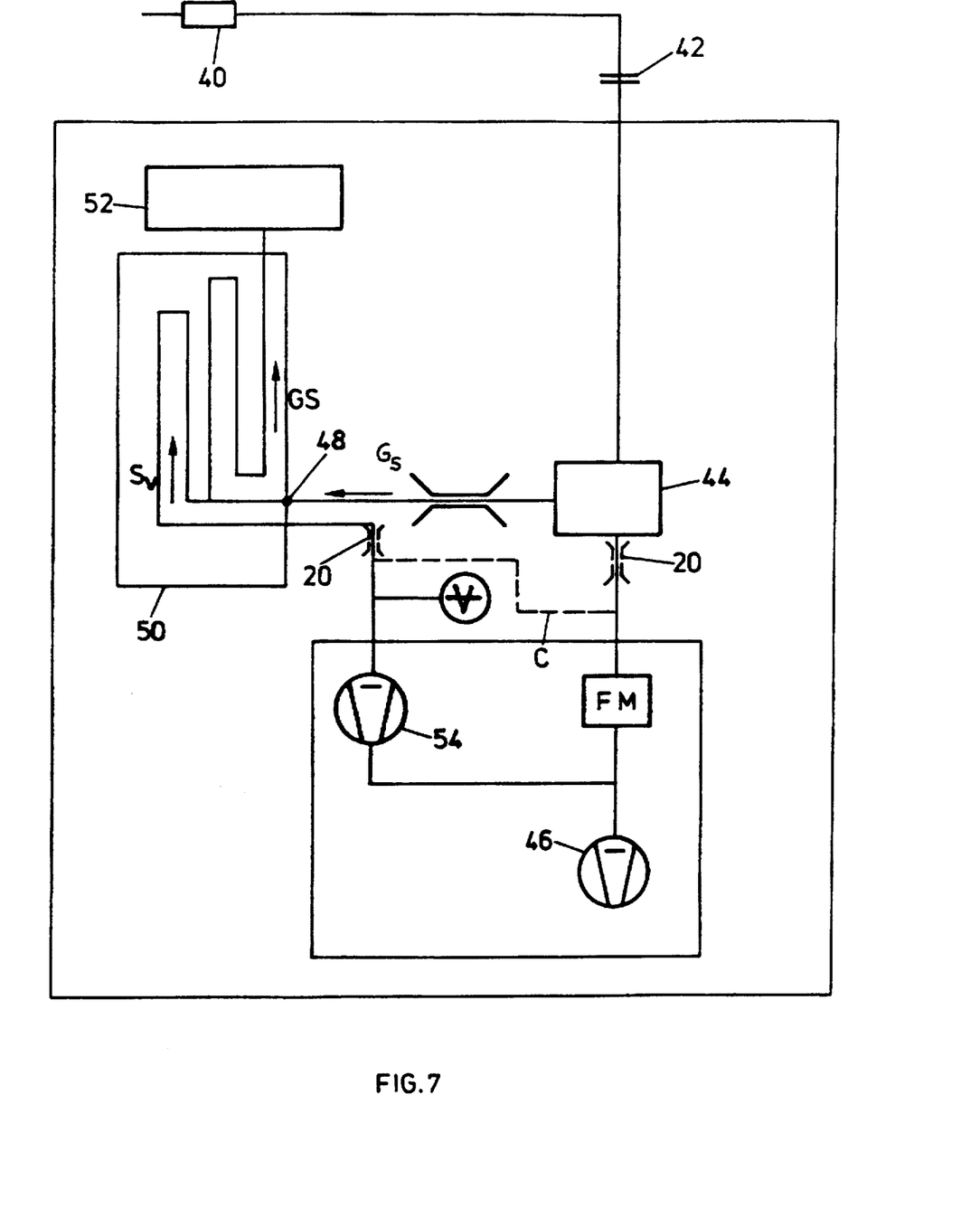
FIG. 7 is the vacuum scheme of a preferred embodiment of a leak detection device according to the invention.

FIG. 7 depicts the vacuum scheme of a preferred leak detection configuration according to the invention for a "sniffing operation". The sniffing probe 40 is supplied via a quick-coupling 42 to a flow divider 44 which, on the side, via a flowmeter FM, is succeeded by a diaphragm pump 46. At the flow divider 44 test gas used as the flow gas $G_S$ and used according to the invention, is branched off in order to be supplied to a center tap 48 of a Holweck pump 50. At the low-pressure side the Holweck pump is connected to a helium detector 52, preferably a mass spectrometer, and more preferably a quadrupole mass spectrometer. At the high-pressure side it is connected to the low-pressure side of a diaphragm pump 54 which is connected at the high-pressure side to the low-pressure side of diaphragm pump 46.

Through the pump stages of the Holweck pump 50 between the center port 48 and the low-pressure inlet of the diaphragm pump 54 the gas $G_S$ flows according to the invention which increases the partial test gas compression at the pump. Light test gas fractions in counterflow $G_S$ flow through the Holweck stages at the detector side. With a configuration such as is depicted in FIG. 7, the following structures were used:

Test gas sensor 52: quadrupole mass spectrometer

Holweck pump 50: TPD 022 by Balzers-Pfeiffer with center port

Diaphragm pumps 54 or 46: KNF, Type PJ 10574-8133

Flow divider 44: T-piece with capillary port

Sniffing probe 40: line to probe

Comparison tests were carried out in which, on the one hand, according to the invention the center 48 as shown in FIG. 7, was connected and, for comparison measurements, was closed, whereas, as shown in dashed line in FIG. 7, a flow connection C was established between the low-pressure side of the diaphragm pump 46 and low-pressure side of the diaphragm pump 54.

Non-molecular flow-dominated or conductance-limiting line segments 20 (dashed lines) can potentially also be installed here.

With the realization of the dashed connection C a known gas flushing of the diaphragm fore-pump 54 is achieved, which, as is known cannot be a kinetic vacuum pump, but rather is a positive-displacement vacuum pump. To the sniffing probe 40 a helium flow of 120 sccm (standard cubic centimeters) was applied and on the center connection 48 in a preferred realization as well as also on the connection shown in dashed lines, a helium flow of 10 sccm was established.

Figure 8:
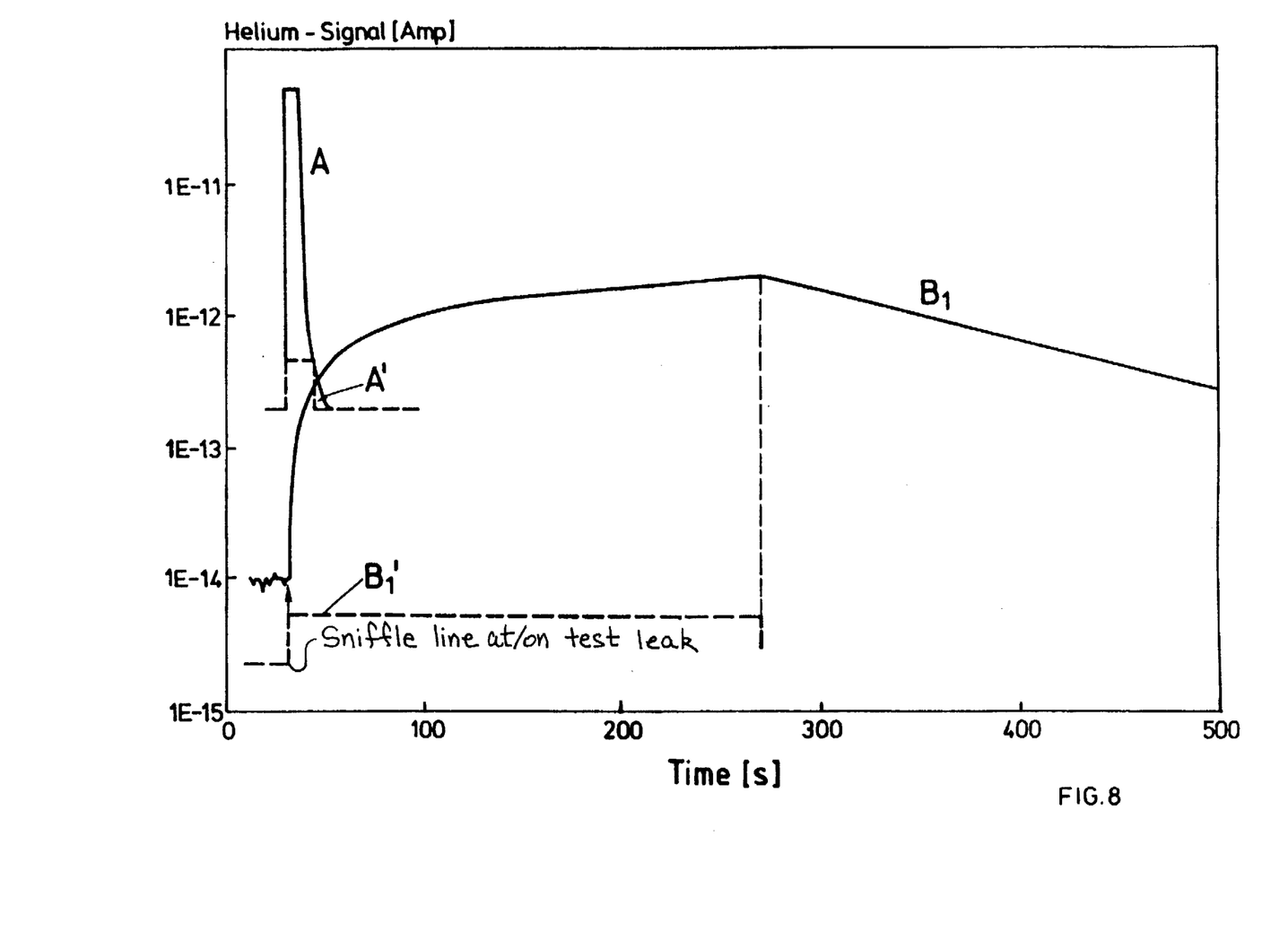
FIGS. 8 each and 9 are graphs plotting the signals measured with the configuration according to FIG. 7, and a known comparison configuration, against time.

In FIG. 8, letter A shows the system response of the configuration, the course $B_1$ is that of the known configuration with the flushing gas line depicted in FIG. 7 in dashed lines; at A' and $B'_1$ the helium signals are shown qualitatively over time.

In the configuration according to the invention after less than 5 seconds the stationary value is reached (course A), in the known configuration it takes more than 200 seconds until a somewhat stable value is reached (course $B_1$).

Figure 9:
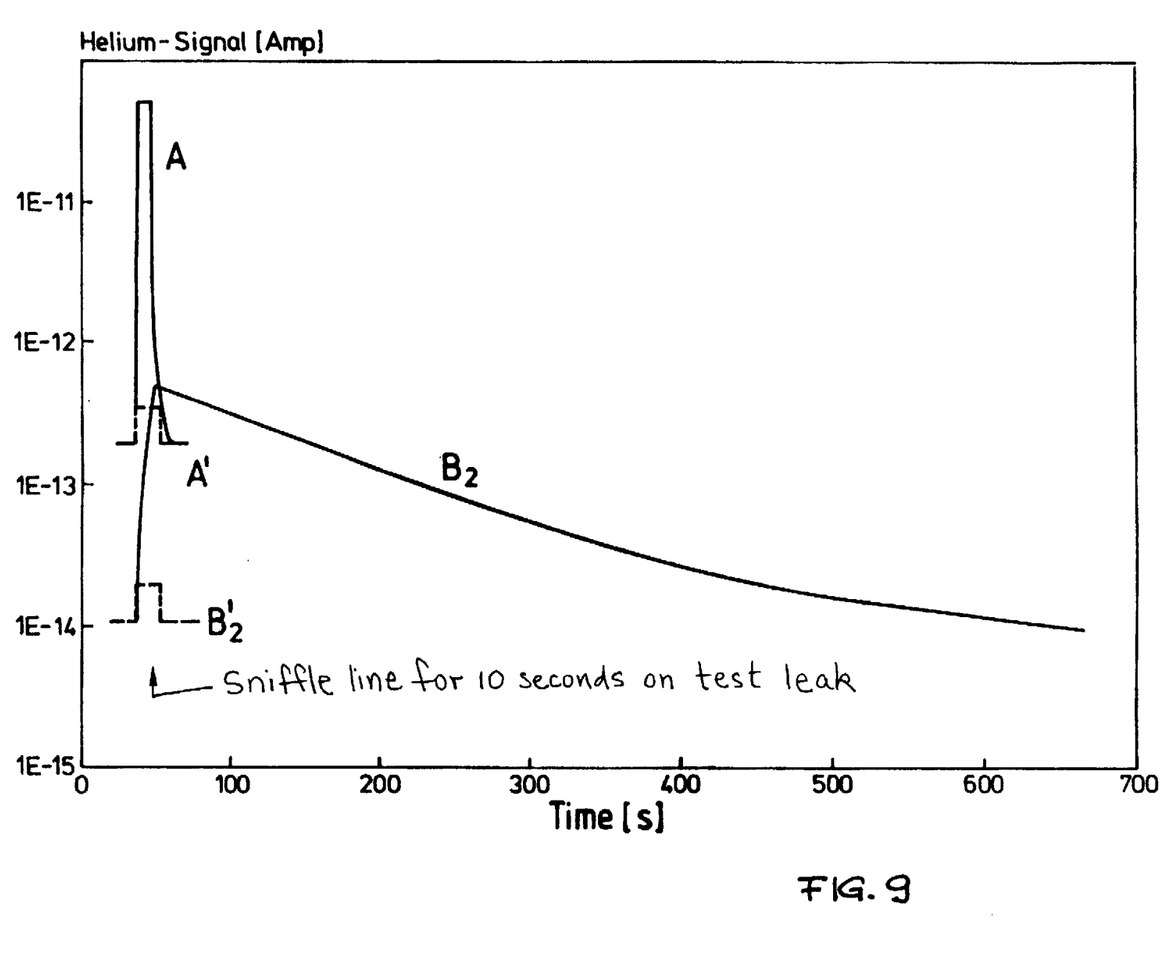

The time behavior for a period of 10 seconds of the sniffting probe 40 in the configuration according to the invention and that previously known is placed on the test leak of $3 \cdot 10^{-3}$ mbars 1/s, is shown in FIG. 9 at A, $B_2$. The helium signals are again shown purely qualitatively at A' and $B'_2$. The extremely short recovery time in the configuration according to the invention after A of approximately 10 seconds is striking, while the recovery time in the previously known configuration according to B is more than 600 seconds.

Consequently, in the preferred gas analysis or leak detection configuration according to FIGS. 4 to 7, an extremely good pulse response of the measuring system is achieved.

While the specific embodiments of the invention have been shown and described in detail to illustrate the application of the principles of the invention, it will be understood that the invention may be embodied otherwise without departing from such principles.

What is claimed is:

1. Process for gas analysis in which an input (11) of a gas analyzer (11a) is placed under vacuum and at least a portion of gas to be analyzed is supplied to an inlet (11b) of the input, the process comprising: applying a pump flux ($S_D$) to the input (11), and applying a further gas flux ($S_V$) which is superimposed on the pump flux, on a non-molecular flow-dominated gas line segment (5, 20, 14) connected to the input, and therewith influencing a partial compression, which is a ratio of the partial pressures at two segments through which flows the pump flux, of a gas line system succeeding the input (11).

2. Process for leak detection by means of a test gas in which the input of a test gas detector (11a, 26, 52) is placed under vacuum and at least a portion of the gas to be tested is supplied to the input, the process comprising: applying a pump flux ($S_D$) to the input and applying a further gas flux ($S_V$) at a non-molecular flow-dominated gas line segment (5, 20, 14, 18, 30, 32, 36, 50, 54, 46) which is superimposed on the pump flux ($S_D$) and therewith influencing a partial compression which is the ratio of the partial pressures at two segments, through which the pump flux flows, of the gas line system succeeding a input (11).

3. Process as stated in claim 1 or 2, wherein the non-molecular flow-dominated gas line segment is at least also co-formed by at least one choke site (20).

4. Process as stated in claim 1 or 2, wherein the non-molecular flow-dominated gas line segment is at least co-formed by at least one kinetic pump stage (14, 18, 30, 32, 36, 50, 54, 46) operating in the Knudsen or viscous pressure range, whose low-pressure input is connected to the input (11).

5. Process as stated in claim 1 or 2, wherein the further flux ($S_V$) is generated with a gas whose partial compression is to be influenced.

6. Process as stated in claim 4, wherein the flux ($S_V$) is generated through gas introduction at a low-pressure side of the kinetic pump stage operating in the Knudsen or viscous range, in order to increase the partial compression of the kinetic pump stage.

7. Process as stated in claim 4, including providing at least one further continuously operating vacuum pump stage which succeeds the kinetic pump stage operating in the Knudsen or viscous range and/or at least one further continuously operating vacuum pump stage which precedes the kinetic pump stage and which operates in the Knudsen and/or viscous and/or molecular pressure range.

8. A gas analyzer device with gas analysis means (11a) and input (11) connected to a vacuum pump system, the vacuum pump system comprising at least one non-molecular flow-dominated gas line segment (5, 20, 14) and a gas connection line in which gas introduction generates a flux ($S_V$) in said gas line segment, connected to the gas line segment.

9. A leak detection device with a test gas detector and input (11) connected to a vacuum pump system, the vacuum pump system comprising at least one non-molecular flow-dominated gas line segment (5, 20, 14, 18, 30, 32, 36, 50, 54, 46) and a gas connection line provided in which a gas introduction generates a flux ($S_V$) in said gas line segment.

10. A device as stated in claim 8 or 9, wherein the non-molecular flow-dominated gas line segment comprises at least one choke (20).

11. A device as stated in claim 8 or 9, wherein the non-molecular flow-dominated gas line segment comprises at least one kinetic pump stage operating in the Knudsen or viscous pressure range, whose low-pressure input is in effect connected with the input.

12. A device as stated in claim 8 or 9, wherein the gas connection line is provided at a low-pressure side of the gas line segment (5, 20, 14, 18, 30, 32, 36, 50, 54, 46).

13. A device as stated in claims 8 or 9, wherein the connection line is connected to a gas supply or with a test or analysis gas port.

14. A device as stated in claims 8 or 9, wherein at least one pump stage is formed by at least one stage of a Holweck pump and at least one stage connected between the gas port and the input of the device or detector, adapted to operate in the molecular range.

15. A device as stated in claim 8 or 9, wherein the analysis device or the detector is a mass spectrometer.

16. A device as stated in claim 15, wherein the mass spectrometer is a quadruple mass spectrometer.

* * * * *